United States Patent [19]

Broman

[11] Patent Number: 4,462,181
[45] Date of Patent: Jul. 31, 1984

[54] DISPOSABLE ANIMAL TRAP

[76] Inventor: David K. Broman, 4100 Patricia La., Boise, Id. 83704

[21] Appl. No.: 376,242

[22] Filed: May 7, 1982

[51] Int. Cl.³ .............................................. A01M 23/18
[52] U.S. Cl. ...................................... 43/61; 220/337
[58] Field of Search ................ 43/63, 60, 61, 62, 81, 43/82, 88, 77; 220/337

[56] References Cited

U.S. PATENT DOCUMENTS

| 691,301 | 1/1902 | Tschantre | 43/61 |
| 2,222,653 | 11/1940 | Chambless et al. | 43/81 X |
| 2,574,322 | 11/1951 | Fitzsimons | 43/81 |
| 3,120,879 | 2/1964 | Warner | 220/337 X |
| 4,122,625 | 10/1978 | Ohtsuka | 43/82 |
| 4,238,902 | 12/1980 | Holl et al. | 43/61 |
| 4,366,642 | 1/1983 | Gardner et al. | 43/82 |

FOREIGN PATENT DOCUMENTS 428819 5/1935 United Kingdom ................ 220/337
1382822 2/1975 United Kingdom ................ 43/62

Primary Examiner—Nicholas P. Godici
Assistant Examiner—P. Weston Musselman, Jr.
Attorney, Agent, or Firm—Paul F. Horton

[57] ABSTRACT

A disposable animal trap for pests, such as mice and rats, comprising pivotal top and bottom members which are spring loaded and which form a retentive enclosure when triggered. The triggering mechanism is the bait itself which is solid and preferably edible and which supports the top and bottom members in an open, animal inviting, position and which triggers the closure of the members when eaten, collapsed, or moved, to retain the pest. The spring may be integral with the top member or a common rubber band may be used as the spring. The top and bottom closure members are preferably made of a high impact molded plastic to resist the gnawing and clawing action of the animal, as well as for cost efficiency.

2 Claims, 9 Drawing Figures

DISPOSABLE ANIMAL TRAP

BACKGROUND OF THE INVENTION

1. Field of the Invention

This invention relates, in general, to animal traps and more particularly to disposable rodent traps.

2. Description of the Prior Art

Removal of mice and rats from conventional rodent traps is repulsive to many people. Likewise the resetting of traps, once used, is particularly abhorrent to health-conscious individuals. Rebaiting and resetting such traps, of necessity, requires the operator to touch areas of the trap with which the rodent has previously made contact. Besides being an unsanitary procedure, such procedure can be dangerous in that it is well known that rodents are carriers of many diseases. Additionally, the setting of the trap which deals a lethal blow to an animal causes anxiety in a number of individuals because of the triggering sensitivity in combination with the sharp blow dealt.

To overcome the problems of visual repulsion and the problem of contamination, a number of traps have been invented, some of which are disposable. Box-like traps which are operable to catch an animal live are typified by U.S. Pat. Nos. 1,648,160 issued to H. J. Boedecker; 1,798,541 issued to J. Kleffman and 2,754,618 issued to H. W. Denabursky. These traps have the disadvantages of not being disposable and, more importantly being dependent upon a triggering mechanism which is independent from the bait. That is, the bait may be taken from the trap because of a malfunctioning or insensitive triggering mechanism. Loss of bait without capturing the animal is indeed a common experience associated with traps having a triggering mechanism independent of the bait.

More recently, disposable traps utilizing an adhesive for trapping the pests have been devised. Illustrative of such traps are U.S. Pat. Nos. 2,962,836 issued to S. T. Hughes; 3,398,478 issued to R. E. Parsall and 4,244,134 issued to H. J. Otterson. Such traps may or may not be effective, depending upon the wariness of the animal and the placement and quality of its adhesive properties. Furthermore, if it is desirable to capture an animal alive for research or other reasons, it is obvious that the adhesive may render the animal unsuitable for such use.

SUMMARY OF THE INVENTION

The present invention comprises, generally, a mechanical, spring loaded trap having two members pivotal with one another and adapted to form a box-like retention container for the animal upon triggering. A solid bait serves as a trigger mechanism by structurally holding the retention members open until the bait-trigger is eaten or otherwise disturbed. A complete description of the invention may be found in the appended claims.

It is therefore a primary object of the present invention to provide an animal trap in which the bait itself serves as a mechanical trigger.

More specifically it is an object of the present invention to provide a trap in which the triggering mechanism is solid edible bait.

Another important object of the present invention is to provide a trap which is inexpensive to construct and which is fully disposable.

It is also an object of the present invention to provide a trap which may be used to trap an animal alive without injury to the animal.

Additional objects and advantages will become apparent and a more thorough and comprehensive understanding may be had from the following description taken in conjunction with the accompanying drawings forming a part of the specification.

DETAILED DESCRIPTION OF THE INVENTION

Figure 1:
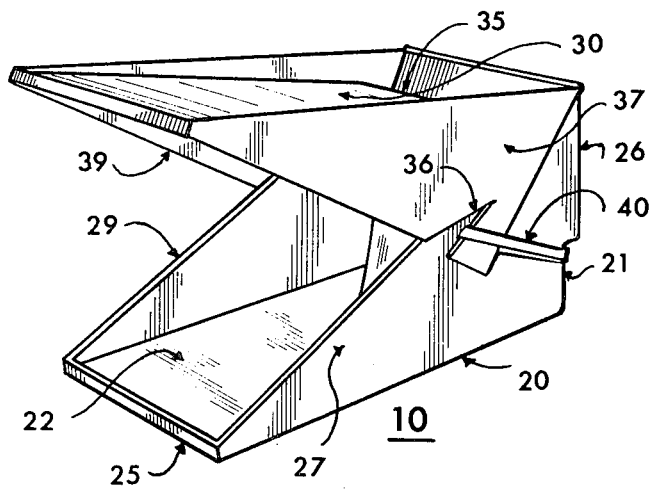
FIG. 1 is a perspective view of one embodiment of the present invention, shown in the open, loaded, position.
Figure 2:
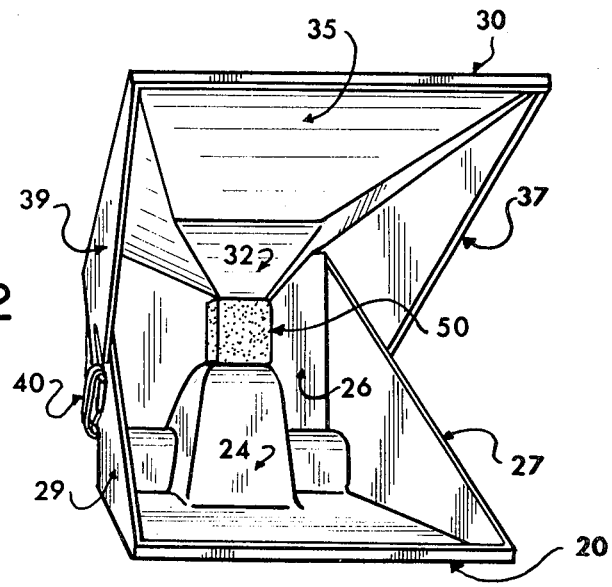
FIG. 2 is a front view of the trap shown in the loaded position.
Figure 3:
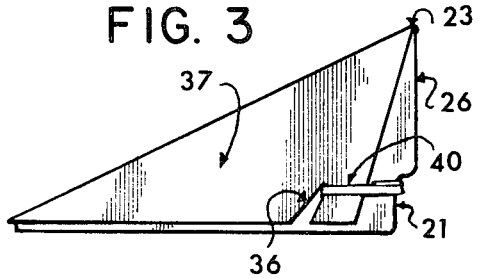
FIG. 3 is a side view of the trap shown in the closed position.

Referring now to the drawings and more specifically to FIGS. 1 and 2, a first embodiment to be preferred of a disposable animal trap 10, made according to the present invention is disclosed. Trap 10 includes a bottom member 20; a top member 30; spring means 40; and a solid bait-trigger member 50.

Top member 30 includes an elongated, substantially rectangular top plate 35 and a pair of oppositely disposed, triangular shaped sides 37 and 39. Top plate 35 may be provided with a downwardly extending projection 32, shown to advantage in FIGS. 2 and 4, for placement of the bait. Sides 37 and 39 of top member 30 are each provided with a hook 36, in the form of a slot, for attachment of spring means 40.

Bottom member 20 is box-like in construction including a base 25, a back plate 26, and a pair of side plates 27 and 29 to define an enclosure 22. The bottom member is provided with an updwardly extending projection 24 from base 25, and in vertical alignment with downwardly depending projection 32 of top member 30. Projection 24 is adapted to make contact with and to support bait-trigger 50 to hold top member 30 in an elevated, open position relative to bottom member 20, as will hereinafter be explained.

Both top and bottom members are preferably molded, in unitary construction, of a high impact plastic for cost effectiveness and to prevent the animal from gnawing or clawing its way to freedom. The members pivotally engage one another adjacent their rearmost ends. A thinning of the plastic at the juncture 23 of top and bottom members has proven adequate for pivoting. Alternatively, a flexible adhesive strip, not shown, will suffice as a hinge. Bottom member 20, in this preferred embodiment, includes an indentation 21 on its back plate 26 for engagement with spring means 40.

Spring means 40 may be constructed of any type of extension spring. It is preferable, because of cost and ready availability, that the spring member be a common rubber band. The spring is attached at one end to hook 36 of side member 37 and at the other end of hook 36 of side member 39, being stretched across bottom member 20 which engages the spring at indentation 21. Where a rubber band is used as a spring member, the band is simply looped about each hook and extended about the bottom member at the indentation, which serves to hold the band in place.

Bait 50 of the present invention must be solid and preferably edible. The bait must be of sufficient structural integrity to hold the top member 30 in an open position relative to the bottom member 20 against the closing force of spring 40. The bait is placed between downwardly extending projection 32 of top member 30 and the base of the bottom member, or the top of upwardly extending projection 24 of the bottom member, where provided. Bait 50 may be in the form of croutons, food pellets, corn, hardened cheese, or the like. Alternatively, solid porous material may be saturated with rodent attracting liquids for bait. It is to be noted that the bait acts as a mechanical trigger in physically supporting the top member against the force of spring 40. When eaten, eroded, or otherwise moved, the bait collapses from its triggering position to cause closure of the trap.

Figure 4:
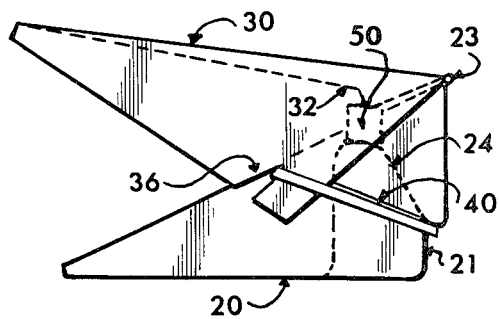
FIG. 4 is a side view of the trap shown in the open position with projections and bait shown in outline.

For operation, the trap, with rubber band 40 in place, is set by spreading the "jaws" of the trap, members 20 and 30, and placing the solid bait 50 between projections 24 and 32 of members 20 and 30, respectively. As shown in FIGS. 2 and 4, the bait maintains the jaws in an open, animal entry, position. Should a rodent, as for example, a mouse be attracted by the bait, it enters the opening and nibbles on or eats the bait. Such nibbling or eating causes collapse of the bait thereby springing the trap. Collapse of the bait causes the top and bottom members to be brought together with the top plate of the top member and enclosure 22 defined by the bottom member forming a pen from which the mouse cannot escape. Where larger animals are involved, it is obvious that a latch may be provided to secure closure of the members.

Referring now to FIGS. 5 through 9, a second embodiment of a trap 10A, made according to the present invention is disclosed. Bottom member 20 is substantially the same as the bottom member of the first embodiment shown, differing primarily in the inclusion of a pin 26 extending through and projecting outwardly from opposing side walls 27 and 29. Pin 26 supports a bait holder 54, which serves the same function as projection 24 of bottom member 20 shown in the first embodiment. Pin 26 also acts as a spring retention member, as will hereinafter be explained, obviating the need for projection 24 and indentation 21 of the bottom member of the first embodiment.

Figure 5:
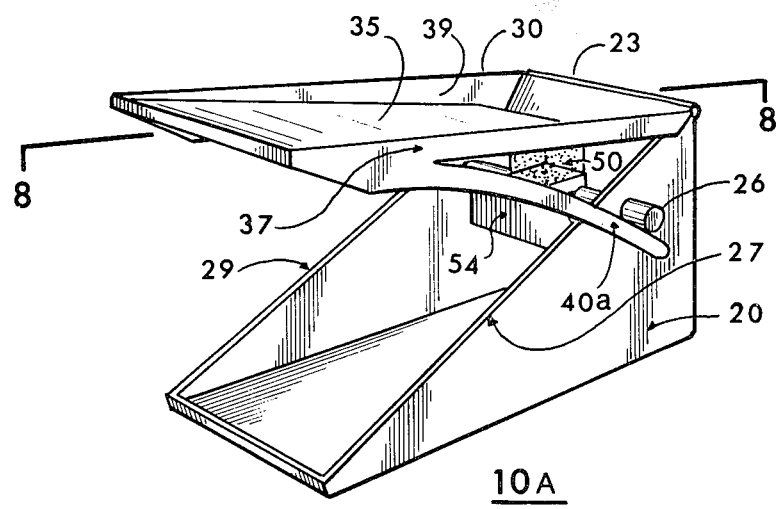
FIG. 5 is a perspective view of a second embodiment of the present invention, shown in the open position.
Figure 6:
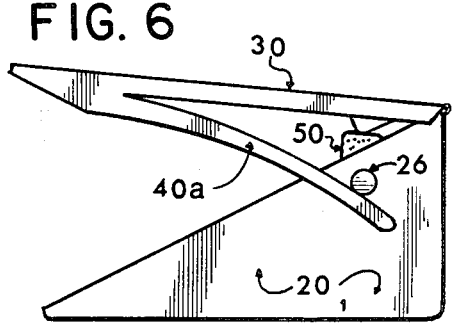
FIG. 6 is a side view of the trap in FIG. 5.
Figure 7:
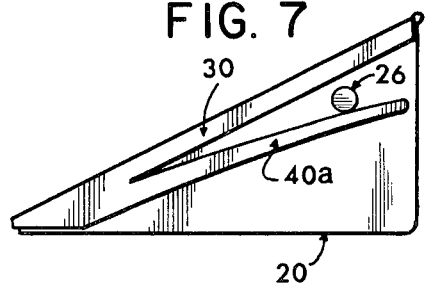
FIG. 7 is a side view of the trap in FIG. 5, shown in the closed position.
Figure 8:
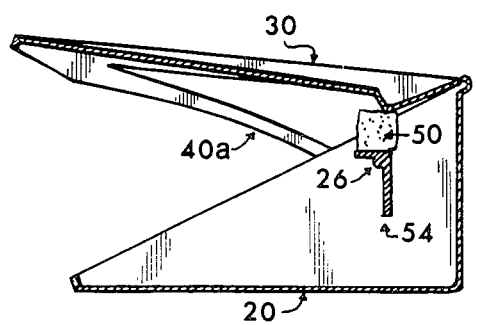
FIG. 8 is a sectional view taken along lines 8—8 of FIG. 5.
Figure 9:
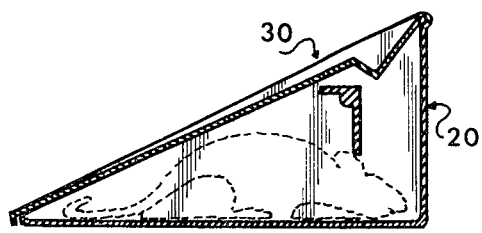
FIG. 9 is a sectional view showing a captured mouse.

Top member 30 of the second embodiment hingably engages bottom member 20 at juncture 23 and is provided with a top plate 35 which declines from front to back providing the same function as downwardly depending projection 32 of the top member of the first embodiment, that of contacting bait 50 to support the top member in an open position. Sides 37 and 39 of the top member of the second embodiment differ substantially from those of the first embodiment in having spring means 40 unitary therewith. In this embodiment spring means 40 is in the form of a pair of strips 40a defined by horizontal cuts in the resilient side walls. Spring strips 40a are sprung down from the remainder of the side walls to engage the lower surface of each of the laterally extending projections of pin 26, as shown in FIGS. 5, 6, and 7. Any plastic having sufficient resiliency will suffice for the construction of the trap. It is also apparent that the trap of either embodiment shown may be constructed of suitable metal.

To operate the trap shown in the second embodiment, spring strips 40a are placed below the opposing projections of pin 26 and the top member 30 lifted to insert solid bait 50 between bait holder 54 and top plate 35 of top member 30. Bait 50, as for example a crouton, supports the top member in an open position against the downward force exerted by the spring strips.

Having thus described in detail a preferred selection of embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. A disposable animal trap comprising:
   a bottom member, boxlike in form and having a front opening, and having spring engagement means;
   a top member pivotally engaging said bottom member adjacent one end thereof for forming a box-like enclosure in the closed position; said top member including a top plate and a pair of oppositely disposed downwardly depending side walls, at least one of said side walls defining a spring member operable to engage said spring engagement means of said bottom member to bring said top and bottom members into closed apposition when triggered; and
   a solid bait trigger member adapted to hold and support said top and bottom members in an open position for entry of an animal and said trigger member operable to cause closure of the members when moved.

2. The apparatus as described in claim 1 wherein the top plate of said top member declines from front to rear to provide a bait contacting surface.

* * * * *